Feb. 27, 1940. E. HODALY 2,191,760
BABY CARRIAGE
Filed March 27, 1939

Inventor
Emerick Hodaly

By J. S. Murray
Attorney

Patented Feb. 27, 1940

2,191,760

UNITED STATES PATENT OFFICE 2,191,760

BABY CARRIAGE

Emerick Hodaly, Detroit, Mich.

Application March 27, 1939, Serial No. 264,291

9 Claims. (Cl. 188—20)

This invention relates to baby carriages and particularly to automatic brakes for baby carriages.

Serious accidents have resulted from uncontrolled travel of baby carriages down declivities and an object of the invention is to safeguard such carriages by equipping them with brakes adapted to be automatically applied on release of manual control.

Another object is to provide a baby carriage with an automatic brake effective on all four wheels of the vehicle.

A further object is to locate such a brake beneath the carriage where it will be no detriment to appearance and will be safeguarded from damage.

These and various other objects are attained by the construction hereinafter described and illustrated in the accompanying drawing, wherein.

Figure 1:
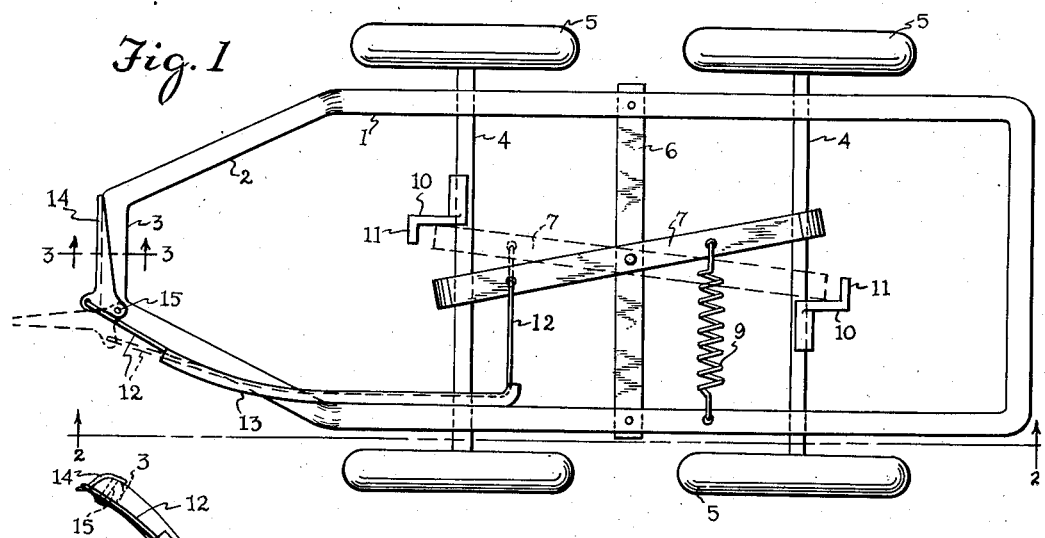
Fig. 1 is top plan view of the wheeled frame of a baby carriage, shown the brake released, and indicating in dash lines the applied position of the brake.
Figure 2:
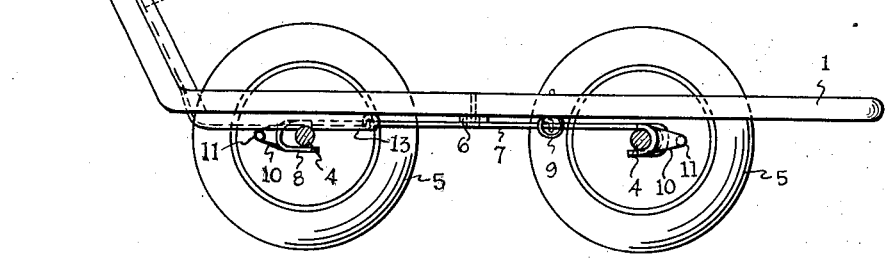
Fig. 2 is a vertical sectional view of the same taken on the line 2—2 of Fig. 1 and showing the carriage body in dash lines.

In these views, the reference character 1 designates a frame, formed preferably of a single length of tubing, having handle-forming rear end portions 2 extending upwardly at a gradual convergence and interconnected by a tubular grip bar 3. Said frame is mounted upon suitably spaced front and rear axles 4 having wheels 5 fixed on their ends.

Figure 3:
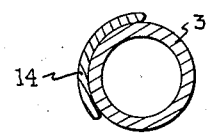
Fig. 3 is a sectional detail of the brake control element, taken on the line 3—3 of Fig. 1.

Midway between said axles a cross bar 6 is riveted or otherwise rigidly secured to the frame and centrally pivoted on such bar is a lever 7 having its ends overlapping the axles and return-bent as indicated at 8 to underlap the axles. A coiled spring 9 connecting the rear portion of said lever to the frame urges the lever toward a transverse relation to the axles and toward engagement of the lever extremities with a pair of brackets 10 secured respectively to the respective axles at opposite sides of the lever. Each of said brackets comprises a terminal finger 11, adapted to rotatively encounter the lever in its bracket-abutting position. Said fingers are parallel to the axles and so spaced from the latter as to rotatively clear the lever ends, thus minimizing the likelihood of the lever encountering one of said fingers in approaching a transverse relation to the axles. To the forward portion of the lever is attached a wire, cable, or other flexible connection 12 which extends through a guide tube 13 along one of the handle members 2 and is connected to a short arm of a bell crank control lever 14 pivoted at 15 on the rear end of said handle member. The longer arm of the bell crank lever is transversely curved so that it may lie closely against and partially embrace the grip bar 3 (see Fig. 3).

In operation of the described brake, the spring 9 holds the lever 7 against the brackets 10 when the bell crank lever is free, both levers then assuming the positions shown in dash lines in Fig. 1. In this location of the parts, it is evident that the fingers 11, or one thereof, must encounter the lever 7, upon rotation of the wheels through less than half a revolution. In most instances, the fractional revolution will be considerably less than half since one of the brackets generally encounters the lever in advance of the other. By hooking the ends of the lever 7 to engage such ends beneath the axles, the upward stresses exerted on the lever ends when encountered by the upwardly moving fingers 11 are very amply resisted, and necessity is avoided for great stiffness of such lever.

When the carriage is to be propelled, the bell crank is maintained in its brake-releasing position (shown in full lines Fig. 1) by the hand or hands (not shown) which then grip the bar 3.

It is to be noted that the described brake exercises its automatic function equally well in preventing forward or rearward uncontrolled travel of the carriage.

It is further to be noted that the grip bar 3 is materially shorter than is usual practice, this permitting the long arm of the lever 14 to be coextensive with the grip bar without increasing the length of said arm unduly.

A desirable feature of the brake is its location on the more vital parts beneath the carriage where they are not likely to be rendered ineffective by any collision or other violent impact involving the carriage.

When the lever 7 is held in brake-releasing position, the cable 12 extends in close proximity to the pivot point of the control lever 14 thus affording the spring 9 only a trifling leverage in acting on the control lever through the cable 12. This avoids the requirement of any material muscular effort in holding the lever 14 in brake-releasing position.

The invention is presented as including all such modifications and changes as come within the scope of the following claims.

What I claim is:

1. In a baby carriage, the combination with a pair of spaced axles, wheels fixed on the ends of such axles, a frame mounted on and journaling said axles, and a handle extending from said frame for propelling the carriage, of a mechanism for obstructing rotation of both axles, including a control element mounted upon the handle, and a spring biasing said mechanism toward its obstructing position.

2. In a baby carriage, the combination with a pair of spaced axles, wheels fixed on the ends of such axles, a frame mounted on and journaling said axles, and a handle extending from said frame for propelling the carriage, of projections carried by and rotatable with the axles, a member pivoted upon the frame for movement to and from a position obstructing rotation of said projections, and actuating mechanism for said member including a control element mounted upon said handle.

3. In a baby carriage as set forth in claim 2, a spring urging said member toward its obstructing position.

4. In a vehicle, the combination with a pair of spaced axles, wheels fixed on the ends of such axles, a frame mounted on and journaling said axles, and a handle extending from said frame for propelling the vehicle, of a projection mounted upon and rotative with each of said axles, a lever pivoted upon the frame approximately equidistantly from the axles and movable to and from a position obstructing rotation of said projections, and actuating mechanism for the lever, including a control element mounted on the handle.

5. A vehicle as set forth in claim 4, said lever having portions extended above and below each axle.

6. A vehicle as set forth in claim 4, the lever having end portions return-bent toward each other and the axles extending between the body of the lever and said end portions thereof.

7. In a vehicle as set forth in claim 4, a spring effective on the lever at one side of its pivot and urging the lever toward its obstructing position, said actuating mechanism taking effect on the lever at the other side of its pivot.

8. In a vehicle, the combination with a pair of spaced axles, wheels fixed on the ends of such axles, and a frame mounted on and journaling said axles, of a projection mounted upon and rotative with each of said axles, a lever pivoted upon the frame approximately equidistantly from the axles and movable to and from a position obstructing rotation of said projections, and actuating mechanism for the lever, including a control element at one end of the vehicle.

9. In a vehicle as set forth in claim 8, spring means biasing said lever toward its obstructing position.

EMERICK HODALY.